(12) United States Patent
Schüetze et al.

(10) Patent No.: US 7,013,304 B1
(45) Date of Patent: Mar. 14, 2006

(54) METHOD FOR LOCATING DIGITAL INFORMATION FILES

(75) Inventors: Hinrich Schüetze, San Francisco, CA (US); James E. Pitkow, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 582 days.

(21) Appl. No.: 09/420,916

(22) Filed: Oct. 20, 1999

(51) Int. Cl.
*G06F 17/30* (2006.01)

(52) U.S. Cl. ...................... 707/100; 707/200; 709/219
(58) Field of Classification Search .............. 707/1–10, 707/100–104.1, 200–206; 709/217–225
See application file for complete search history.

(56) References Cited

U.S. PATENT DOCUMENTS

| | | | |
|---|---|---|---|
| 5,721,899 A * | 2/1998 | Namba | 707/3 |
| 5,878,028 A | 3/1999 | Roy et al. | 370/235 |
| 6,208,993 B1 * | 3/2001 | Shadmon | 707/102 |

OTHER PUBLICATIONS

Clark et al., Efficient Suffix Trees on Secondary Storage, Jan. 1996, ACM-SIAM, 383-391.*
Selzer, M. and Yigit, O., "A New Hashing Package for UNIX," USENIX, Winter '91, Dallas, Texas, pp. 173-184.

* cited by examiner

*Primary Examiner*—John E. Breene
*Assistant Examiner*—Jean Bolte Fleurantin
(74) *Attorney, Agent, or Firm*—Fliesler Meyer LLP

(57) ABSTRACT

Improved method, data structure and computer readable medium for searching for digital information files. Files referenced by URLs may be quickly located by finding a minimum unique prefix for the desired URL, breaking the prefix into substrings, and traversing a trie data structure to find indices to another trie data structure that will yield the physical location of the stored digital information file. A node data structure may be used to construct the trie data structures, and may be compressed to allow the tries to occupy less memory, thus allowing the tries to be maintained in memory and less access to storage devices. The result is faster retrieval times for digital information files.

19 Claims, 5 Drawing Sheets

METHOD FOR LOCATING DIGITAL INFORMATION FILES

FIELD OF THE INVENTION

The present invention relates broadly to computers. Specifically, the present invention relates to managing resource names in a computer. More specifically, the present invention relates to data structures that allow improved retrieval of digital information files referenced by resource names.

BACKGROUND OF THE INVENTION

The problem of naming, identifying and accessing material is not new in the analog or digital realms. In the analog world, systems such as In Service Book Numbers (ISBN) provide a manner to assign unique names to books, Universal Product Codes (UPC) codes uniquely identify products, and passport numbers identify individual people. In the digital world, one of the most common methods for addressing digital information is Uniform Resource Locators (URLs). URLs provide a well-defined syntax for addressing resources across a range of extendable protocols and name spaces. Not only do URLs exist in the digital world, but also they regularly appear in the analog world in newspapers, on television, and in billboard advertisements.

While the presence of URLs may be widespread, knowledge of URLs is limited. Numerous questions arise including: what is the average length in bytes of the typical URL, the sizes of the shortest and longest URLs, and how compressible URLs may be. Fundamental knowledge of the basic characteristics of URLs may lead to better resource name intensive services.

URLs are among the major contributions to the initial development of the World Wide Web (WWW). URLs provided the syntax to glue together the numerous disparate Internet protocols by breaking named resources into protocol, host, and path components. In this manner, different resources within the name space of a host may be named, different hosts identified, different transport protocols addressed, and new transport protocols added when developed. URLs often contain semantic information including the hierarchical nature of resources, descriptive names, version numbers, and temporal information.

It is advantageous to store collections of documents such as web pages in order to provide quick access to locations on the WWW. URL length, or the distribution of the length as measured in characters of all URLs is an important consideration for any such storage scheme. As document collections become larger and larger, the problems associated with efficient management become increasingly complex. Even such a conceptually simple task as determining the location of a file on disk must balance the demands of limited main memory and processing efficiency. To address this problem, there is a need to efficiently map large numbers of URLs to physical locations in a manner that allows quick searches and does not require excessive storage space.

SUMMARY OF THE INVENTION

The present invention provides improved method, data structure and computer readable medium for searching for digital information files. Digital information, such as computer files referenced by URLs, may be quickly located by finding a minimum unique prefix for the desired URL, breaking the prefix into substrings, and traversing a trie data structure to find indices to another trie data structure that will yield the physical location of the stored computer file. A node data structure may be used to construct the trie data structures, and may be compressed to allow the tries to occupy less memory.

In one aspect, an embodiment of the present invention provides a method of retrieving computer files comprising the steps of determining a minimum unique prefix for a resource name associated with a computer file, traversing at least one trie data structure to determine a physical location of the computer file, and retrieving the computer file from the physical location.

In another aspect, an embodiment of the present invention provides a method of retrieving a computer file comprising the steps of traversing at least one trie data structure to verify whether a resource name associated with a computer file indicates that the computer file is located in a storage device, checking a local memory for the computer file if the resource name is not located in the trie, searching for the computer file on a computer network if the computer file is not in local memory, and retrieving the computer file from its physical location.

In yet another aspect, an embodiment of the present invention provides a data structure for retrieving computer files, which includes an information field for storing information associated with a physical location of a computer file, and a plurality of pointer fields for linking the data structure to other data structures. The data structure linked together to form at least one trie data structure that, when traversed, indicates the physical location of a computer file.

In still another aspect, an embodiment of the present invention provides a computer readable storage medium for use with a computer apparatus. The medium includes computer instructions for determining a minimum unique prefix for a resource name associated with a computer file. The computer instructions also traverse at least one trie data structure to determine a physical location of the computer file, and retrieve the computer file from the physical location.

Other features and benefits of the present invention will be apparent from the detailed description of the invention when considered with the accompanying drawings.

DETAILED DESCRIPTION

Figure 1:
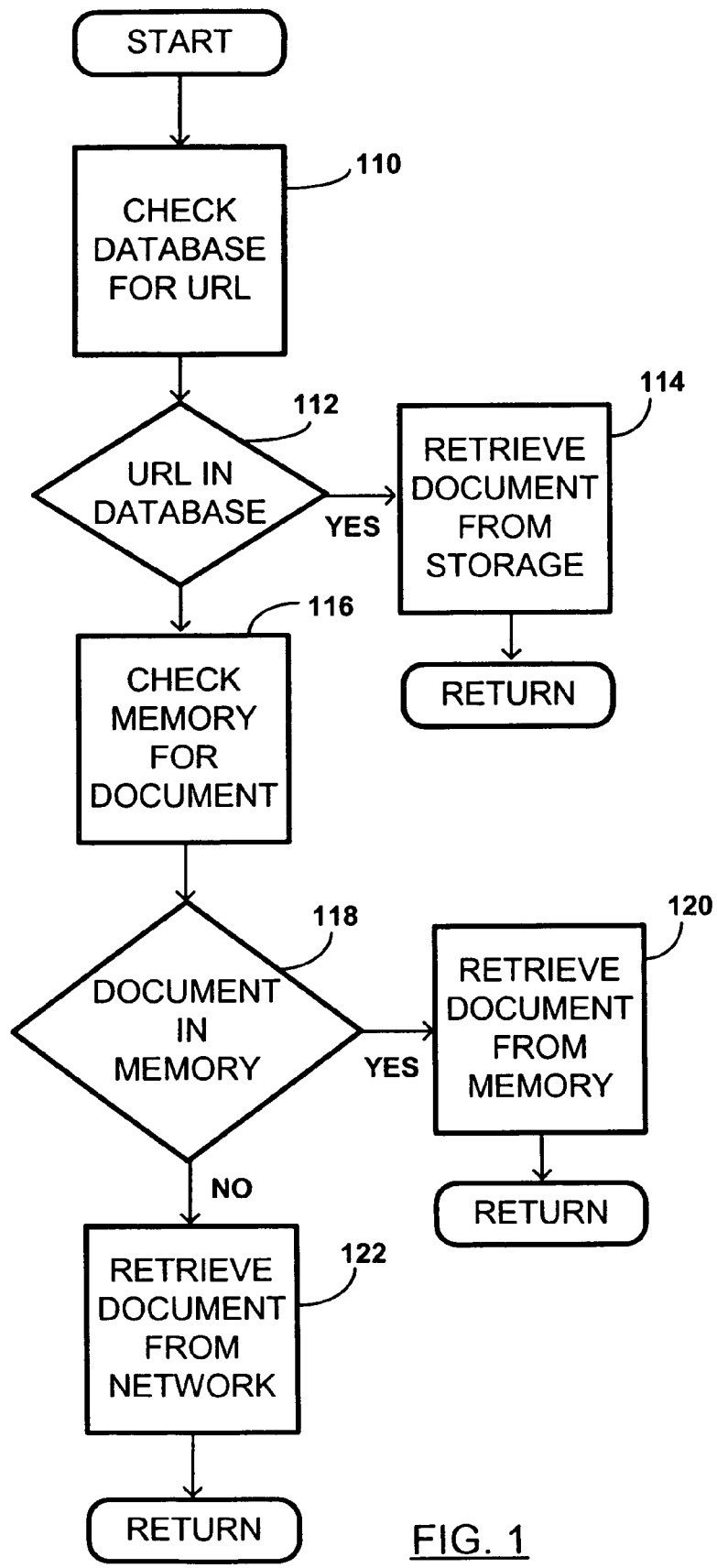
FIG. 1 shows functional steps of an embodiment of the present invention.
Figure 7:
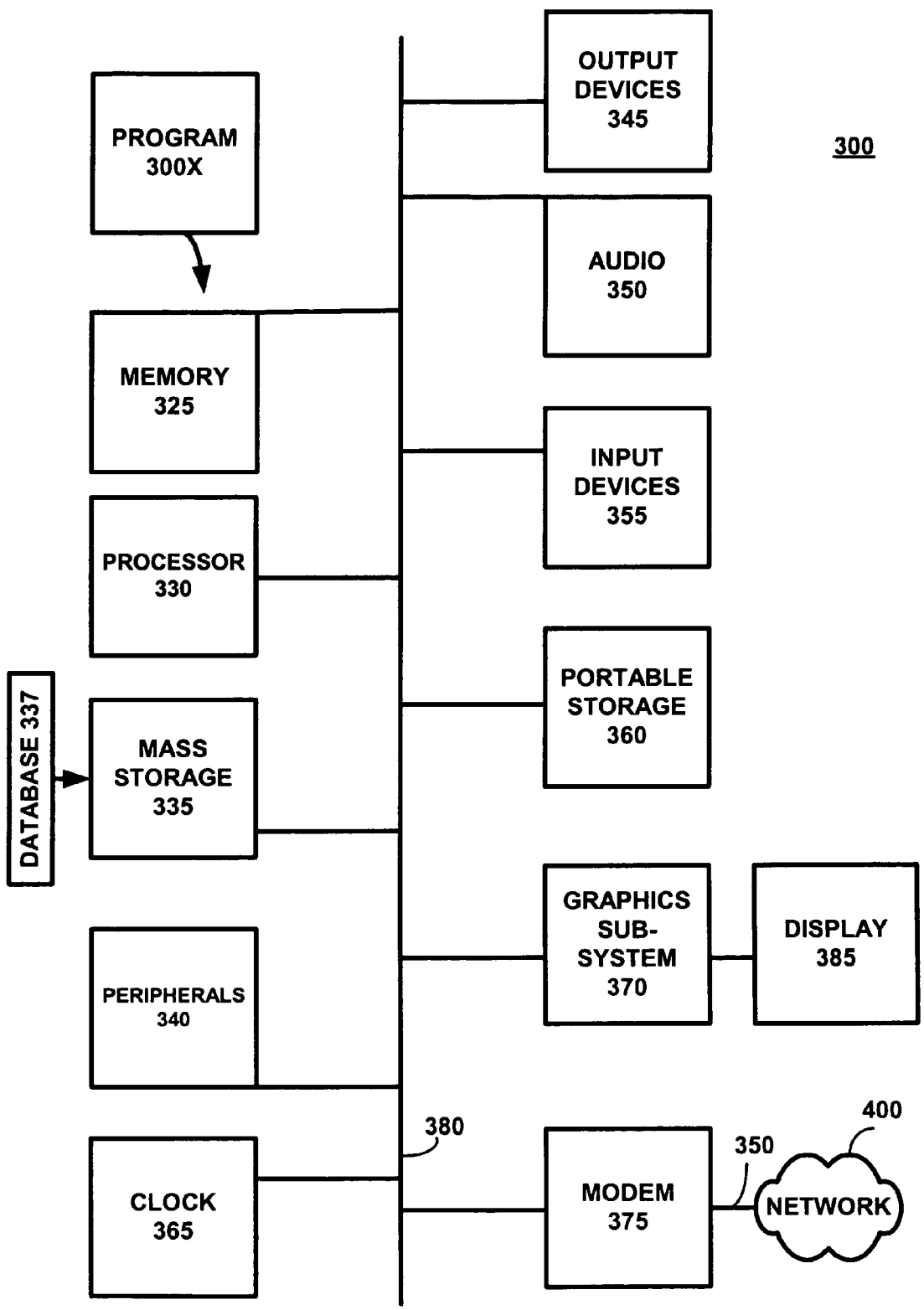
FIG. 7 is a high level block diagram of a computer used with an embodiment of the present invention.

An embodiment of the present invention provides improved management of resource names by utilizing data structures that are compact and allow fast searches. An embodiment of the invention may utilize stored collections of files such as web pages stored in database 337 as seen in FIG. 7, and memory 325, and a connection 350 to computer network 400 (which may be the WWW), where additional files may be stored. FIG. 1 illustrates the operative steps executed by an embodiment of the present invention to optimize access to a desired web page or other file. When a request is made for access to a web page, a search is made at step 110 to determine if the requested URL is stored in database 337. If the URL is located in the database 337 (step 112) control proceeds to step 114, where the file is retrieved from storage device 335. However, if the URL is not located in the database 337, control proceeds to step 116 where memory 325 may be searched for a copy of the file referenced by the URL. If the file is stored in memory 325 (step 118) it may be retrieved at step 120, otherwise control continues to step 122 where the file is retrieved from the computer network 400. The goal is to provide the user with the fastest access to the file. Steps 116–120 may also be performed prior to steps 110–114.

As discussed above, a URL supplies an address to a file such as a web page by listing a string of alphabetic and/or numeric characters. Alphabetic characters are used to form strings that are readable by humans, such as "www," "com," "home," etc. As used herein, such alphabetic strings are referred to as "vocabularies." These vocabularies may be useful in quickly locating URLs associated with computer files stored in the database 337.

Figure 2:
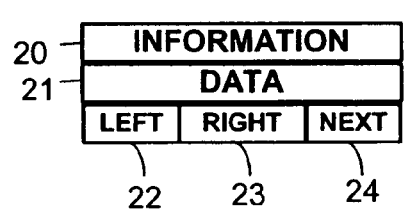
FIG. 2 shows a data structure embodiment of the present invention.

Directing attention to FIG. 2, data structure 25 is stored in memory 325 and used to map a URL to a physical location in storage device 335 where the corresponding web page resides. Data structure 25 is a collection of fields containing URL information and pointers to link multiple data structures together as nodes in a trie. Data structure 25 may include five fields. The information field 20 contains information characterizing the node such as a letter for the vocabulary or a number (corresponding to a word from the vocabulary) for the index strings. The data field 21 contains information associated with the node such as the number that a particular word is mapped to in the case of the vocabulary; the target information (e.g., physical location in storage device 335) in the case of the index strings.

Pointers such as left pointer 22, right pointer 23, and next pointer 24 reference other data structures in a trie. While the left pointer 22 and right pointer 23 reference child nodes on left or right branches, respectively, additional pointers may be added to use a trie other than a binary trie.

Figure 3:
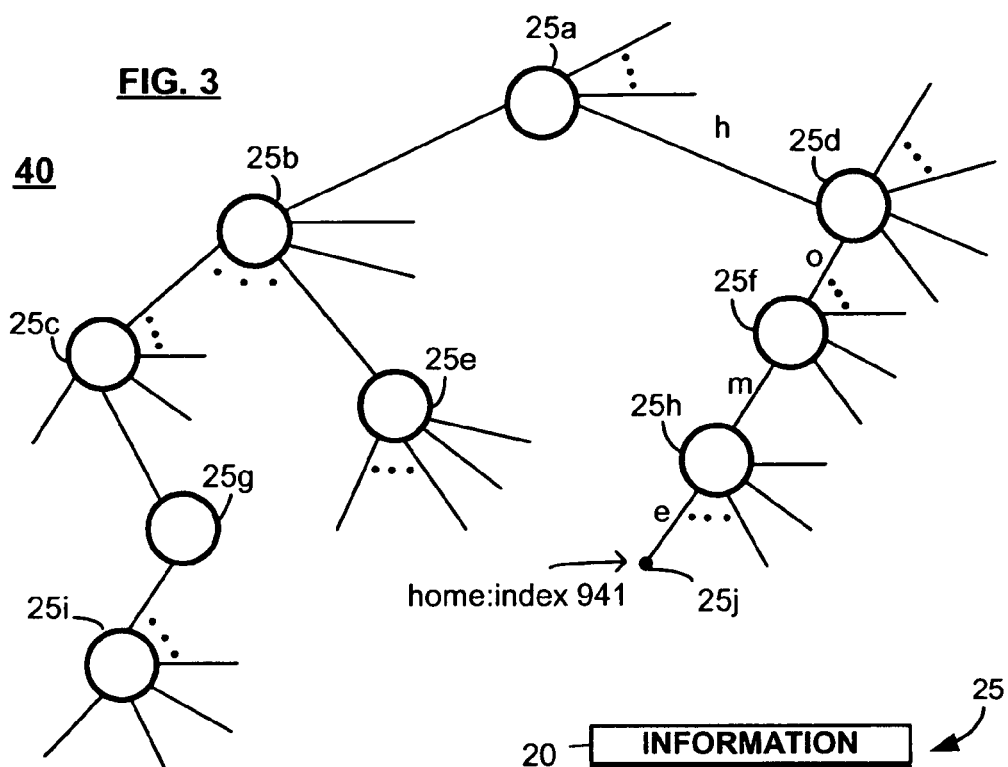
FIG. 3 shows a vocabulary trie embodiment of the present invention.
Figure 4:
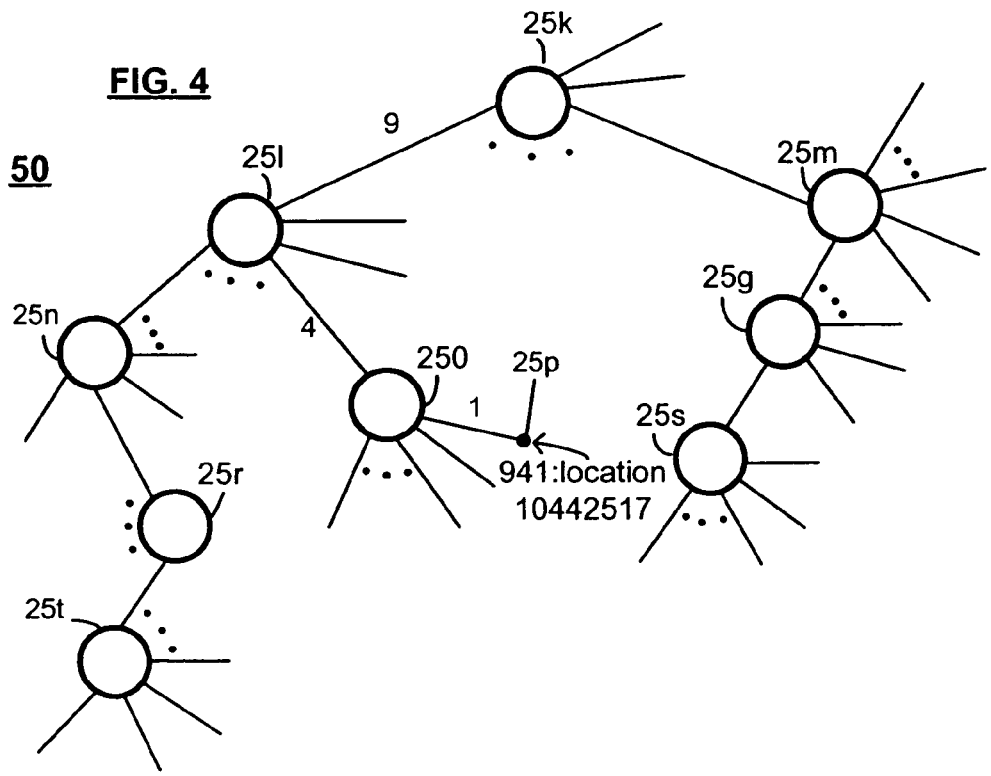
FIG. 4 shows a index trie embodiment of the present invention.

FIG. 3 shows the vocabulary trie 40. The vocabulary trie 40 is a data structure constructed from nodes (instances of data structure 25) and is used to hold the vocabulary of the minimal prefix. By traversing the nodes, different strings or substrings may be found. Commonly used substrings may be assigned index numbers (941), stored in data structure 25, which may be looked up in index trie 50 (FIG. 4) to find the physical address (10442517) of the URL located in storage device 335. As mentioned in the discussion of data structure 25 in FIG. 2, vocabulary trie 40 and index trie 50 may be constructed in a similar fashion as a binary trie, or may have more paths (left child, right child) than a binary trie.

Figure 5:
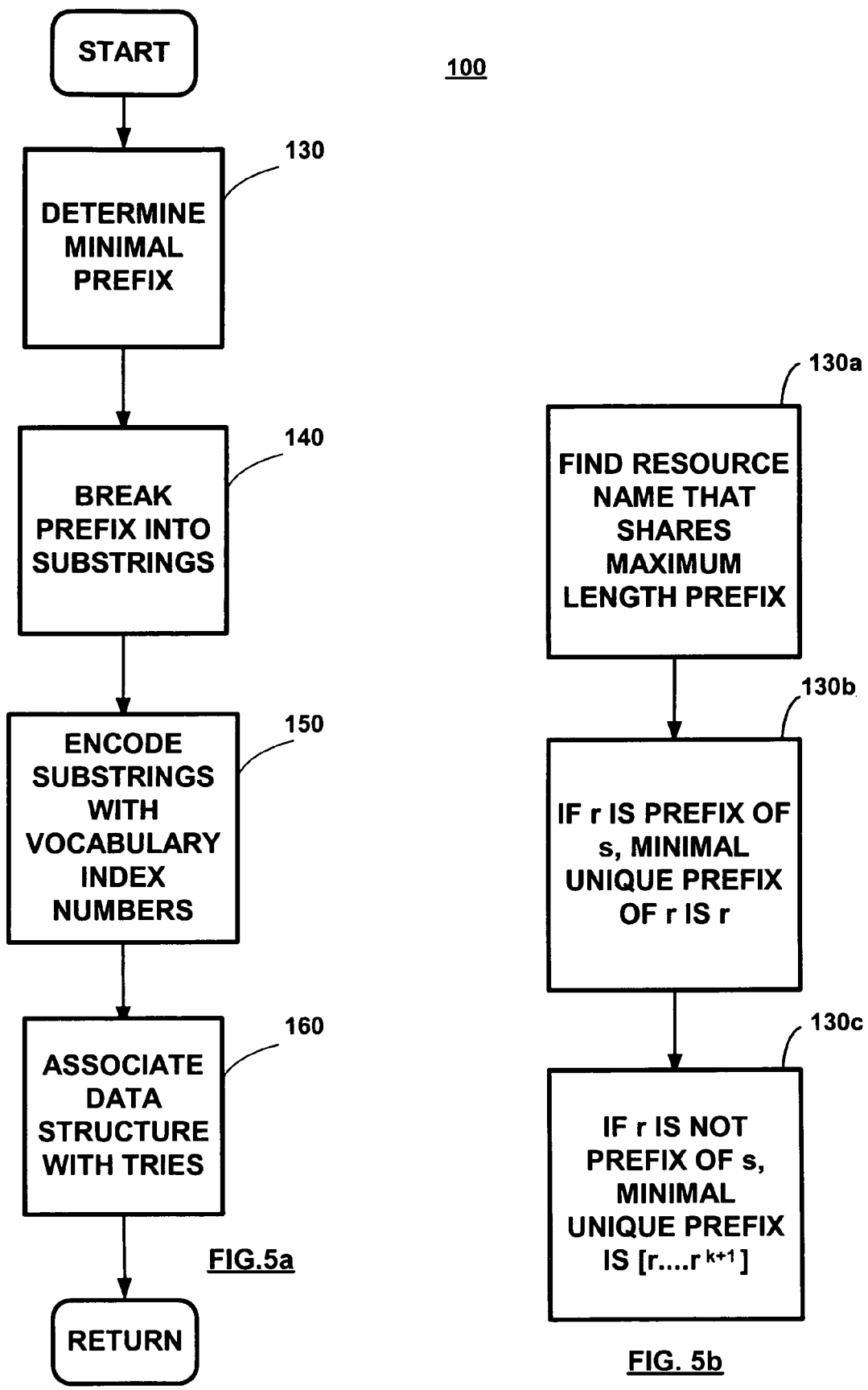
FIG. 5a is a flowchart illustrating the steps to create a data structure embodiment of the present invention.
FIG. 5b is a flowchart illustrating the steps to determine a minimal prefix as used in an embodiment of the present invention.

FIG. 5a shows the operative steps to create data structure 25. At step 130 the minimal unique prefix for a resource name is determined. A definition and proof of uniqueness of minimal unique prefixes is provided below. In Table 1, the minimal unique prefixes of the two URLs in (a) are given in (c).

TABLE 1

| | | |
|---|---|---|
| (a) | url 1 | www.company.com/home/yankovelich |
| | url 2 | www.company.com/home/zimmermann |
| (b) | common prefix | www.company.com/home/ |
| (c) | minimal unique prefix 1 | www.company.com/home/y |
| | minimal unique prefix 2 | www.company.com/home/z |
| (d) | substring analysis of 1 | www .company .com /home /y |
| | substring analysis of 2 | www .company .com /home /z |
| (e) | index string encoding of 1 | 0 526 20 154 5988 |
| | index string encoding of 2 | 0 526 20 154 8321 |

TABLE 2

| | | data structure | total bytes | bytes per URL | |
|---|---|---|---|---|---|
| full urls | verbatim | | 3,092,540,631 | 62.5 | |
| | SKIRN | total | 1,331,761,764 | 26.9 | 100% |
| | | vocabulary trie | 345,244,180 | 7.0 | 26% |
| | | index string trie | 986,517,584 | 19.9 | 74% |
| MUPS | verbatim | | 2,647,582,500 | 53.5 | |
| | SKIRN | total | 618,704,212 | 12.5 | 100% |
| | | vocabulary trie | 138,999,208 | 2.8 | 22% |
| | | index string trie | 479,705,004 | 9.7 | 78% |

At step 140, each minimal unique prefix is broken into a string of substrings. Punctuation marks may be used as break points (one could also use points with maximum entropy, that is points where the uncertainty about the next character is large). For example, the minimal unique prefix of the urls in (a) in Table 1 are broken up as shown in (d).

At step 150, each substring is encoded with a vocabulary index number. Similarly, each URL is encoded as a string of vocabulary index numbers. For the two URLs in (a) of Table 1 this could look as shown in (e).

At step 160, data structure 25 is associated with two tries; one for the vocabulary (trie 40), and one for the index strings (trie 50). Trie 40 could also be stored in a binary tree.

Keeping trie 40 and trie 50 in memory 325 allows the quick retrieval of a file referenced by a URL. To optimize the use of memory 325, each trie may be compressed by eliminating all null pointers. Data field 21, left pointer 22, right pointer 23, and next pointer 24 are null elements (containing no data) for many nodes. In the case of pointers, a pointer is a null pointer if there is no left, right, or next element from the point of view of the current node. The data field 21 is a null pointer if the prefix of characters up to this node do not form a valid word (in the vocabulary trie 40) or the prefix of index numbers up to this node do not form a valid index string (in the index string trie 50).

Null pointers may be eliminated by reserving the four leftmost bits of the information field as indicators for the presence of these four fields: data field, left pointer, right pointer, next pointer. For example, if a bit is set to the value 1, then the corresponding field is present. If the bit is set to 0, then the corresponding field is absent. If it is absent no memory is allocated for this field. During compression, each zero pointer and zero data field is eliminated and its indicator bit set to zero.

Data structure 25 works well where URLs share many alphanumeric sequences, both initially and "medially". For example, "www" occurs often in the beginning of URLs, "home" occurs often in the middle. Creating a vocabulary of shared common substrings takes advantage of this property. URLs often have long suffixes that do not distinguish one resource name from another. For example, in Table 1 the suffixes "ankovelich" and "immermann" aren't necessary to distinguish the respective URL from other URLs (assuming that Yankovelich and Zimmermann are the only two people with homepages in the directory "home"). Storing minimal unique prefixes instead of full URLs thus saves memory.

It is also advantageous that the full original resource name can be verified. Each web page may be stored together with certain meta information, including its full URL. If a resource name is located in the tries 40 and 50, it is only known that the minimal unique prefix is a member of the stored set. Without verifying the URL, it is not known whether the resource name that gave rise to this prefix is identical to the target resource name or another resource name with the same prefix. The URLs that correspond to the computer files in database 337 may also be maintained in a list located in memory 325 or storage device 335.

A minimal prefix exists for a group of URLs. The minimal prefix is important for maintaining data structure 25 in the smallest amount of space possible. For a given resource name r, one may determine the prefix of maximum length $k_i$ it shares with each other resource name $s_i$. The $k_i$ that is largest will give us a minimal unique prefix. Let $R=\{r_1, r_2 \ldots, r_n\}$ be a set of URLs. Directing attention to FIG. 5b, the minimal unique prefix p of a resource name r defined operationally at step 130 is determined as follows: Step 130a: Find a resource name s in R (its "close neighbor") that shares a prefix of maximum length k with r. Step 130b: If r is a prefix of s, then the minimal unique prefix of r is r. Step 130c: If r is not a prefix of s, then the minimal unique prefix of r is $[r^1, r^2, \ldots, r^{k+1}]$, where $r^j$ is the $j^{th}$ character of r.

A proof of uniqueness for the minimal unique prefix follows. Assume that two different strings p and q are minimal unique prefixes of r. Assume p was created based on close neighbor s and a maximum shared common prefix of length k and that q was created based on close neighbor t and a shared common prefix of length l. If k=l, then p and q have the same length. They therefore must be identical since they are prefixes of the same string. This is a contradiction with the premise p≠q. If k≠l, we can assume k>l without loss of generality. But then there exists a string, namely s, that has a longer common prefix with r than t. This is in contradiction with the assumption that t shares a common prefix of maximum length with r.

One practical problem in the implementation is that a resource name's minimal unique prefix depends on the whole set of URLs. In determining the minimal unique prefix, all URLs that share a long prefix must be considered.

In an embodiment of the present invention, this problem is solved by a two-pass process. In the first pass short prefixes of a fixed size k are counted. Then groups of prefixes may be formed such that each group has roughly the same number of URLs starting with that prefix. Each group may be treated separately (with a risk of a small loss in optimal compression). After minimal unique prefixes have been determined, the vocabulary may be collected and compressed in vocabulary trie 40. Then all minimal unique prefixes are rewritten as index strings. Then the index trie 50 is constructed by storing the index strings and then compressed. Finally, the physical location information is inserted in the index string trie 50.

Table 2 gives the size of the set of URLs after the various processing steps. Note that although we only realize a compression by approximately 15% when going to minimal unique prefixes, the tails of URLs which are often unique and therefore require a large amount of storage space are compressed. This explains why a data structure based on minimal unique prefixes uses less than half the space of a data structure based on full URLs. The per-url number for "verbatim" is slightly inflated since there are duplicate URLs, perhaps a multiple of 10,000.

Figure 6:
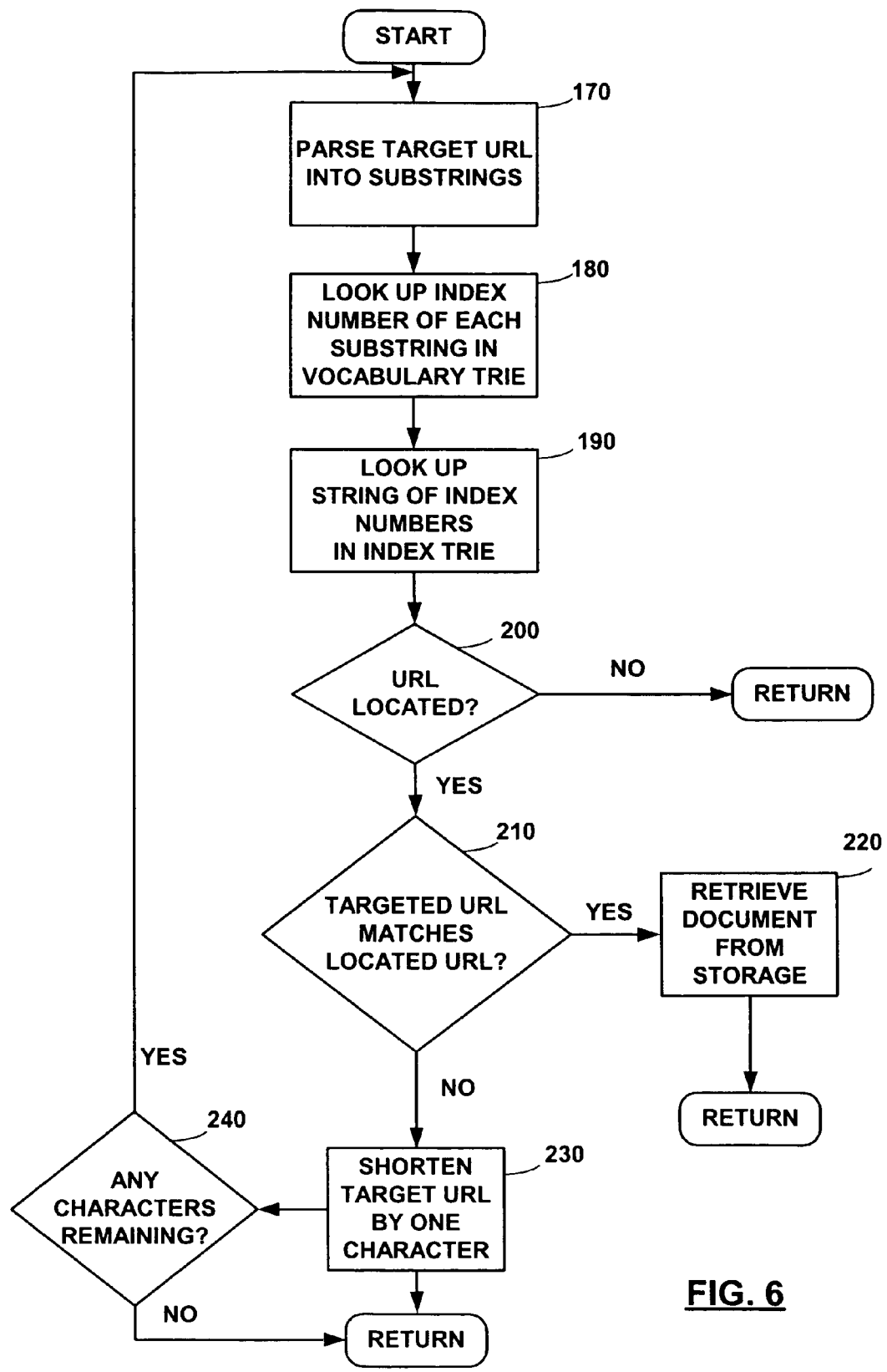
FIG. 6 is a flowchart illustrating the steps to retrieve a file according to an embodiment of the present invention.

FIG. 6 describes how a URL ("the target resource name") may be retrieved. At step 170 the target resource name is parsed into substrings. At step 180, the index number of each substring is looked up in the compressed vocabulary trie 40. Upon reaching node 25i (an instance of data structure 25, FIG. 3), the target resource name is retrieved as a string of index numbers. At step 190 the string of index numbers is looked up in the index string trie 50, perhaps locating node 25p (another instance of data structure 25), where the physical address in storage device 335 for a URL having the minimal prefix may be found. If the URL is not located (step 200) the process terminates, otherwise control continues to step 210 where the target URL is compared to the located URL. A reference source for the URL may be consulted to verify that the retrieved resource name is identical with the target resource name. This may be achieved by checking the stored collection of web pages in storage device 335 (since the physical location of the web page in storage device 335 may be stored in the trie 50), reading the full URL from storage device 335 and comparing it to the target URL. If there is a match, control proceeds to step 220, where the file associated is retrieved from storage device 335; otherwise control transitions to step 230 where the target URL is shortened by one character. If there are remaining characters in the target URL (step 240) the search will be repeated as control returns to step 170.

FIG. 7 is high-level block diagram view of an embodiment of a computer system having a computer program that causes the computer system to perform an embodiment of the present invention. The computer system 300 includes a memory 325 and a processor 330. Memory 325, stores, in part, instructions and data for execution by processor 330. If an embodiment of the present invention is wholly or partially implemented in software, including a computer program 300X, memory 325 stores the executable code when in operation. Computer program 300X may be utilized to create instances of data structure 25 and to execute the operational steps discussed above in FIGS. 1, 5a, 5b, and 6. Memory 325 may include banks of dynamic random access memory (DRAM) as well as high speed cache memory. Also stored in memory 325 are instances of data structure 25, linked together in tries 40 and 50. Memory 325 may include a cache in which collections of files are stored such as web pages or the like that may be referenced by a URL. Processor 330 may contain a single microprocessor, or may contain a plurality of microprocessors for configuring the computer system as a multi-processor system. The system 300 further includes a storage device 335, for storing collections of files such as web pages. Such collections may be organized into a stored database 337 within storage 335. Computer system 300 may also include peripheral device(s) 340, input device(s) 355, portable storage medium drive(s) 360, a graphics subsystem 370 and a display 385. For simplicity, the components shown in FIG. 7 are depicted as being connected via a single bus 380. However, the components may be connected through one or more data transport means. For example, memory 325 and processor 330 may be connected via a local microprocessor bus, and the storage device 335, peripheral device(s) 340, portable storage medium drive(s) 360, and graphics subsystem 370 may be connected via one or more input/output (I/O) buses. Storage device 335, which is typically implemented with a magnetic disk drive or an optical disk drive, is a non-volatile storage device for storing data and instructions for use by processor 330. Computer program 300X also may be stored in processor 330. Portable storage medium drive 360 operates in conjunction with a portable non-volatile storage medium, such as a floppy disk, or other computer-readable medium, to input and output data and code to and from the computer system 300. Peripheral device(s) 340 may include any type of computer support device, such as an input/output (I/O) interface, to add additional functionality to the computer system 300. For example, peripheral device(s) 340 may include a network interface card for interfacing computer system 300 to a network, and/or a modem for accessing web pages located on computer network 400, which may include the world wide web. A communication medium 350 may also be used to connect computer system 300 to computer network 400. Input device(s) 355 may provide a portion of a user interface. Input device(s) 355 may include an alpha-numeric keypad for inputting alpha-numeric and other key information, including target URLs. Input device 355 may also include a pointing device, such as a mouse, a trackball, stylus or cursor direction keys. In order to display textual and graphical information, the computer system 300 includes graphics subsystem 370 and display 385. Display 385 may include a cathode ray tube (CRT) display, liquid crystal display (LCD), other suitable display devices, or means for displaying, that enables a user to interact with the computer program. Graphics subsystem 370 receives textual and graphical information and processes the information for output to display 385. Retrieved web pages may be displayed on display 385. Additionally, the system 300 may include output devices 345. Examples of suitable output devices include speakers, printers, and the like. The devices contained in the computer system 300 are those typically found in general purpose computer systems, and are intended to represent a broad category of such computer components that are well known in the art. The computer system of FIG. 7 illustrates one platform which can be used for practically implementing the method of the present invention. Numerous other platforms can also suffice, such as platforms with different bus configurations, networked platforms, multi-processor platforms, other personal computers, PDA's, workstations, mainframes, and the like. Alternative embodiments of the use of the method of the present invention in conjunction with the computer system 300 further include using other display means, such as CRT display, LCD display, projection displays, or the like. Likewise, any similar type of memory, other than memory 325, may be used. Other interface apparatus, in addition to the component interfaces, may also be used including alpha-numeric keypads, other key information or any pointing devices such as a mouse, trackball, stylus, cursor or direction key.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of this invention.

The invention claimed is:

1. A method of retrieving digital information files comprising the steps of:
    (a) determining a minimum unique prefix for a resource name associated with a digital information file;
    (b) determining at least one index for the minimum unique prefix;
    (c) traversing a trie data structure based on the at least one index to determine a physical location of said digital information file; and
    (d) retrieving said digital information file from said physical location.

2. The method of claim 1, including the step of constructing said trie from node data structures containing information related to said physical location and pointers for linking to other node data structures and said step of traversing includes reading information stored in node data structures.

3. The method of claim 2, further including the step of reducing the amount of memory required to contain said trie.

4. The method of claim 3, where in said step of reducing the amount of memory includes the step of eliminating all null pointers in said nodes.

5. The method of claim 4 wherein said step of eliminating null pointers includes the step of placing bits in said node data structures to indicate that null pointers have been eliminated in said trie.

6. The method of claim 5 wherein said bits are placed in said data field.

7. The method of claim 2 where said trie is constructed with more than two branches from each node.

8. The method of claim 1, wherein said step of determining at least one index for the minimum unique prefix includes traversing a first trie data structure to find the at least one index.

9. The method of claim 1, wherein said minimum unique prefix is parsed into substrings and the at least one index is associated with said substrings; and wherein the substrings are used to traverse the trie.

10. The method of claim 1, further including the step of comparing the resource name associated with said digital information file to a resource name associated with said minimum unique prefix.

11. The method of claim 10, further including the step of shortening said minimum unique prefix if it does not match said resource name associated with said minimum unique prefix.

12. The method of claim 10 wherein said resource name associated with said digital information file is maintained in a list of resource names.

13. The method of claim 10 wherein said resource name associated with said digital information file is retrieved from said digital information file.

14. The method of claim 1 wherein said trie is constructed as a binary trie.

15. A method of retrieving a digital information file comprising the steps of:
    (a) translating a resource name into at least one index and traversing a trie data structure based on the at least one index to verify whether the resource name associated with a digital information file indicates that the digital information file is located in a storage device;
    (b) checking a local memory for said digital information file if said resource name is not located in said trie;
    (c) searching for said digital information file on a computer network if said digital information file is not in said local memory; and
    (d) retrieving said digital information file from its physical location.

16. A machine readable medium having instructions stored thereon that when executed by a processor cause a system to:
    (a) determine a minimum unique prefix for a resource name associated with a digital information file;

(b) determine at least one index for the minimum unique prefix;
(c) traverse a trie data structure based on the at least one index to determine a physical location of said digital information file; and
(d) retrieve said digital information file from said physical location.

17. The machine readable medium of claim 16, further comprising instructions which when executed cause a system to:
construct the trie from node data structures containing information related to said physical location and pointers for linking to other node data structures; and
wherein said step of traversing includes reading information stored in node data structures.

18. The machine readable medium of claim 16, wherein said step of determining at least one index for the minimum unique prefix includes traversing a first trie data structure to find the at least one index.

19. The machine readable medium of claim 16, wherein said minimum unique prefix is parsed into substrings and indexes associated with said substrings are used to traverse the trie.

* * * * *